Patented Apr. 17, 1945

2,373,725

UNITED STATES PATENT OFFICE 2,373,725

SYNTHETIC HYDROCARBON RESINS AND PROCESS FOR MAKING THE SAME

Alger L. Ward, Drexel Hill, Pa., assignor to The United Gas Improvement Company, a corporation of Pennsylvania No Drawing. Application March 28, 1939, Serial No. 264,593

7 Claims. (Cl. 260—82)

This invention pertains generally to the polymerization of crude distillates containing unsaturated hydrocarbons, and pertains particularly to the production of a resin which is valuable for use in varnishes.

In the high temperature cracking of petroleum oils, for example, in the manufacture of oil gas or carburetted water gas, there is formed a complex mixture of hydrocarbons from which liquid constituents may be obtained by condensation. Tar is an example of a complex mixture of hydrocarbons obtained by condensation at atmospheric temperature.

Upon distillation of the tar or of light oil derived therefrom, a portion is recovered which boils between about 75° C. and 140° C. and consists largely of aromatic hydrocarbons such as benzene, toluene and the xylenes.

Another portion boiling between about 140° C. and 190° C. contains, in addition to large quantities of higher aromatics, a relatively large percentage of a considerable number of different unsaturated hydrocarbons.

The light oil from which these cuts are derived is fundamentally different from the light oil or solvent naphtha derived from coal tar in that this material contains no more than traces of any oxygen containing bodies, whereas coal tar light oil contains relatively large quantities of oxygen containing compounds of which cumarone is a well known example.

I have discovered that a new and useful resin product can be obtained upon the catalytic polymerization of a more or less narrow crude fraction separated from the hydrocarbon mixtures obtained as the result of cracking oil in gas manufacture.

Since a small amount of low boiling material will considerably lower the initial boiling point, and since a small amount of high boiling material will considerably raise the end boiling point, and further since it is difficult to obtain an end boiling point because of the likelihood of polymerizing the last few percent of the unsaturated material, I prefer to define my crude fractions in terms of intermediate boiling points or boiling ranges.

For this purpose the 5% and 10% boiling points are more useful and accurate than the initial boiling point, and the 80% and 90% boiling points are more useful and accurate than the end boiling point. When distilling at atmospheric pressure even the 90% boiling point may be unreliable.

I find, for instance, that when the 5% boiling point is approximately 167.2° C., or above, and when the 90% boiling is approximately 174.6° C., or below, that a highly useful resin product may be obtained upon polymerization.

On the other hand, when the 5% boiling point is much below 167.2° C., or the 90% boiling point is much above 174.6° C., the character of the resin changes very rapidly.

Expressed in terms of the 10% boiling point and the 80% boiling point which are the more reliable, the temperatures become approximately 167.4° C. and 173.2° C. respectively.

In describing my crude fractions, therefore, it might be said that a preponderate portion boils between 167° C. and 174.6° C.

Having obtained my crude fraction as above defined, for instance by distillation, I proceed to catalytically polymerize it preferably using a catalyst of the metallic halide type or a complex thereof, for example, a boron trifluoride-organic solvent complex, such as boron trifluoride-diethyl ether complex, boron trifluoride-dimethyl ether complex, boron trifluoride-phenyl ethyl ether complex, boron trifluoride-phenyl methyl ether complex, boron trifluoride-dioxan complex, and boron trifluoride-toluene complex. The ether complexes are especially suitable. Boron halides are grouped with the metallic halides because of their similarity of action.

Other examples of complex catalysts are the aluminum chloride-organic solvent complexes.

Accordingly, the metallic halides which are preferably employed in the practice of my invention are characterized by the fact that they are capable of hydrolyzing in the presence of water to give an acid reaction. They may for convenience be designated therefore as acid-acting metallic halides.

The preparation of complexes of this character, in general, comprises adding the halide to the solvent with agitation. If a reaction takes place, which depends upon the solvent chosen, a definite chemical compound is formed which comprises the complex.

Complex catalysts may be employed in the form of suspensions, emulsions or solutions in organic solvents of which benzene, toluene, and solvent naphtha are examples. Such suspensions, emulsions, or solutions are formed by adding the catalyst to the solvent followed by stirring. As an example, I find that a concentration of complex in toluene of 1% by weight of toluene is very suitable as a catalyst suspension, although any other concentration or solvent suitable for the purpose may be employed.

The crude fraction may be employed in the form of a solution in a suitable solvent of which benzene, toluene and solvent naphtha are examples.

The following specific example will serve to further illustrate the invention.

EXAMPLE 1

A 1000 grams portion of a crude fraction falling within my specification and containing 66% of unsaturates, as determined by the well known bromine titration method, was diluted with 500 grams of commercial toluene. This diluted material was added to 1000 grams of commercial toluene containing 10 cubic centimeters of boron trifluoride-diethyl ether complex in suspension.

The addition was made over a period of one hour with constant agitation.

Agitation was continued for a period of 6½ hours to allow sufficient time for the reaction to become complete.

During the addition of the materials and during the subsequent agitation, the temperature was maintained in the neighborhood of 27° C.

At the end of the 6½ hour period, 20 grams of water were added for hydrolyzing the catalyst. This was followed by agitation for 1 hour whereupon 140 grams of quicklime (CaO) were added for neutralization and drying. This was followed by agitation for 2 hours.

At the end of the 2 hour period a small amount of a filter aid, such as fuller's earth or diatomaceous earth was added and the solution filtered.

The filtrate was subjected to steam distillation and the yield of dry polymer was 513 grams. This was equivalent to 51.3% of the weight of the crude fraction used as starting material or 77.7% of the total unsaturated hydrocarbons present.

As above indicated, the properties of resins prepared in this manner vary widely with the inclusion of substantial quantities of materials boiling above or below the preferred boiling ranges set forth above.

This is clearly shown in the following table wherein is set forth boiling range data and polymerization results for five different samples.

TABLE 1

Boiling range of crude light oil fractions in ° C.

|  | Sample 1 | Sample 2 | Sample 3 | Sample 4 | Sample 5 |
| --- | --- | --- | --- | --- | --- |
| 1st drop | 164.4 | 166.0 | 168.4 | 169.5 | 168.6 |
| 5% | 165.9 | 167.2 | 169.2 | 170.9 | 171.2 |
| 10% | 166.1 | 167.4 | 169.4 | 171.0 | 171.8 |
| 20% | 166.4 | 167.7 | 169.6 | 171.3 | 172.2 |
| 30% | 166.6 | 168.0 | 169.7 | 171.7 | 172.5 |
| 40% | 166.9 | 168.2 | 169.8 | 171.9 | 172.8 |
| 50% | 167.1 | 168.4 | 169.9 | 172.1 | 173.1 |
| 60% | 167.4 | 168.6 | 170.0 | 172.4 | 173.4 |
| 70% | 167.7 | 168.9 | 170.3 | 172.7 | 173.7 |
| 80% | 168.1 | 169.3 | 171.0 | 173.2 | 174.3 |
| 90% |  | 172.9 |  | 174.6 | 176.5 |
| 95% | 169.3 |  |  |  |  |
| Dry or decomposed | 174.3 | 178.3 | 184.3 | 187.3 | 186.9 |
| Density, $d\ 20°/4°$ | 0.8909 | 0.8908 | 0.8933 | 0.8996 | 0.9051 |
| Refractive index $n\ 20°/D$ | 1.5181 | 1.5200 | 1.5252 | 1.5246 | 1.5250 |
| Unsaturation by bromine titration in per cent | 48.2 | 52.3 | 61.6 | 55.4 | 57.1 |

Results upon polymerization

|  | Sample 1 | Sample 2 | Sample 3 | Sample 4 | Sample 5 |
| --- | --- | --- | --- | --- | --- |
| Yield in per cent of starting material | 28.5 | 35.8 | 54.3 | 49.7 | 47.6 |
| Yield in per cent of unsaturation | 59.4 | 67.4 | 88.2 | 89.7 | 83.4 |
| Color, Gardner scale | 13.5 | 8.8 | 5.0 | 4.5 | 9.5 |
| Softening point by A. S. T. M. ball and ring method, ° C | 74.8 | 88.2 | 95.0 | 104.8 | 127.4 |
| Solubility in grams per 100 grams of solvent: |  |  |  |  |  |
| Ether | 100 | 100 | 100 | 100 | 100 |
| Acetone | 100 | 100 | 100 | 100 | 100 |
| Toluene | 100 | 100 | 100 | 100 | 100 |
| High flash petroleum naphtha | 100 | 100 | 100 | 100 | 100 |
| Ethyl alcohol (95%) | 1.93 | 0.42 | 0.51 | 0.49 | 0.69 |
| Isoamyl alcohol | 14.5 | 5.0 | 1.56 | 0.67 | 1.02 |

It will be noted that the 5% boiling point of sample 2 is 167.2° C., that the 10% boiling point is 167.4° C., and that the lower portion of this sample is, therefore, satisfactory. The corresponding boiling points of sample 1 are at least one degree lower and, therefore, unsatisfactory.

It will also be noted that the 80% boiling point of sample 4 is 173.2° C., that the 90% boiling point is 174.6° C., and that the upper portion of this sample is, therefore, satisfactory. The corresponding boiling points of sample 5 are at least 1° C. higher and, therefore, unsatisfactory.

It will also be noted that the 5% and 10% boiling points respectively of samples 3, 4 and 5 are higher than the corresponding boiling points of sample 2. Therefore, the lower portions of samples 3, 4, and 5 are satisfactory. Also the 80% and 90% boiling points (the latter if taken) of samples 1, 2, and 3 are lower than the corresponding boiling points of sample 4. Therefore, the upper portions of samples 1, 2, and 3 are satisfactory. However, overall samples 1 and 5 are preferably excluded, the former because of its lower end and the latter because of its higher end. On the other hand, if the unpreferred upper or lower portion, as the case may be, were eliminated, samples 1 and 5 also would be satisfactory.

In other words, samples 2, 3, and 4 come within the preferred 5% to 90% and 10% to 80% boiling ranges above specifically set forth.

Referring now to the results obtained upon polymerization, it is significant that the yield of resin drops off with samples 1 and 5, and that the color increases with both samples.

It is also significant that the softening point of the resin drops sharply with sample 1 and rises sharply with sample 5.

It is also significant that the solubility of the resin in 95% ethyl alcohol or in isoamyl alcohol increases with samples 1 and 5, even though with samples 2 and 3 the solubility is slightly higher than with sample 5 in the case of isoamyl alcohol.

The foregoing shows that the resin obtained upon polymerization of crude fractions falling within the preferred intermediate boiling ranges is unique in physical characteristics, and this is proven by experiment when this resin is incorporated in a varnish.

For instance, the resin produced from the samples 2, 3, and 4 is highly suitable for varnish purposes, whereas the resin produced from sample 1 is less satisfactory because of its lower softening point and that from sample 5 is less satisfactory because it can be incorporated into varnish oils only with considerable difficulty. Both should be excluded in order to secure a reasonably uniform product.

Samples 1 to 5 were polymerized under identical conditions, namely, the conditions particularly set forth in Example 1, except that the time of reaction was shortened to 6 hours.

Polymerization conditions may be varied considerably without departing from the spirit of the invention.

Attention is, however, directed to the effect of variation in concentration of catalyst. This is shown in Table 2.

TABLE 2
*Effect of quantity of catalyst on polymerization*

| Exp. No. | Quantity of catalyst, grams/100 g. unsaturates | Yield per cent of unsaturates | Softening point | Gardner color | Solubility, grams/100 g. solvent | |
|---|---|---|---|---|---|---|
| | | | | | Ethyl alcohol | Isoamyl alcohol |
| 1 | 0.718 | 62.9 | 122.4 | 2.0 | 0.86 | 3.43 |
| 2 | 1.44 | 82.9 | 114.2 | 2.5 | 0.42 | 6.85 |
| 3 | 2.87 | 89.0 | 105.8 | 3.0 | 6.36 | 8.79 |
| 4 | 5.75 | 98.0 | 91.0 | 6.5 | 1.87 | 17.1 |

In the experiments of Table 2, a typical sample of my starting material was employed. This corresponded to a mixture of samples 2 to 4 inclusive of Table 1 to the exclusion of samples 1 and 5. The diluent was benzene and was present in each case to the extent of 50% of the oil. The catalyst was boron trifluoride-diethyl ether complex. The softening points were determined by the A. S. T. M. ball and ring method.

All of the polymers were completely soluble in ether, acetone, toluene, and in high flash petroleum naphtha.

It will be noted that with increase in quantity of catalyst, the yield increases progressively to approximately theoretical, the softening point decreases, color tends to increase, particularly with relatively large quantities of catalyst, and solubility in organic solvents such as in isoamyl alcohol increases. Such increase also increases compatibility with varnish oils as well as improves the quality of the film formed by the varnish.

Care is preferably taken not to employ excessive quantities of catalyst. For instance, when using boron trifluoride-diethyl ether complex, the percentage of catalyst to the unsaturates present in the oil might be held below, say 3% to reduce color, and under certain circumstances, it may be preferred to maintain the percentage of catalyst below 2.5% or lower, to improve still further the color of the resin. On the other hand, larger quantities of catalyst may be employed without departing from the broad concept of the invention.

Since the unpolymerized starting material is subject to polymerization and oxidation on standing, I prefer to use freshly prepared starting material, or if the starting material has been standing some time, I prefer to distill it prior to use.

In general, the effect of ageing of the starting material prior to polymerization is to increase the color, decrease the yield, and decrease the softening point.

The advantages of using freshly distilled starting material is thus clearly evidenced.

I may wash the unpolymerized starting material with dilute aqueous alkali, such as a dilute solution of caustic soda, to insure the absence of or decreased concentration of compounds, such as sulfur compounds, peroxides, aldehydes and if the presence of phenols is not desired also the phenols.

Washing with dilute alkali is preferably followed either by a water wash, or by dry or steam distillation, or any two or more of the foregoing to remove residual alkali, as well as residual impurities.

Therefore, if a crude fraction derived from tar produced in the pyrolytic decomposition of petroleum oil, has my boiling range specifications but does not produce a polymer having the expected properties, I find it expedient to freshly distill the starting material before polymerization, or to wash with dilute alkali or other reagent, or both.

However, regardless of whether the starting material has been washed or freshly distilled, samples boiling slightly below my preferred boiling range produce polymers of lower softening point and of substantially greater color than samples within my preferred boiling range.

Furthermore, samples boiling slightly higher than my preferred boiling range produce polymers which have substantially higher softening points and frequently substantially higher color, and which are less readily incorporated in varnish oils.

By employing light oil fractions falling within my preferred intermediate boiling range, polymers of a relatively high degree of uniformity for commercial purposes may be produced.

The unique character of my new resin may be defined by its softening and solubilizing characteristics.

Its softening point after the removal of unpolymerized oil is approximately between 80° C. and 115° C. by the A. S. T. M. ball and ring method.

It is completely soluble in an equal part of ether, acetone, toluene or high flash naphtha, and has at least a significant solubility in isoamyl alcohol.

My new resin is compatible with linseed oil and China-wood oil, and is highly suitable for varnish formulations in which these oils are employed. Reference is made to my copending application Serial No. 466,223, filed November 19, 1942.

For instance, my new resin retards the gelation of China-wood oil during the cooking process to an excellent degree.

Furthermore, the resulting varnish has very good drying and durability characteristics and shows very good resistance to attack by ordinary solvents, water and alkaline solutions.

It permits the use of conventional amounts of drier in varnish formulations with satisfactory results.

Moreover, my new resin is superior to the usual types of resins produced from cracked distillates or, for example, the cumar type resins, due to its excellent color stability. Even on extended exposure to light my new resin shows no tendency to after-color.

My new resin is further characterized by its colorless and transparent nature, particularly when incorporated in a varnish.

When incorporated in standard varnishes the film is substantially colorless, has a very smooth finish, is free from tackiness, and imparts a pleasing sensation to the touch.

Examples of varnishes containing my new resin are as follows:

EXAMPLE 2

Mix 125 pounds of my resin with 200 pounds of China-wood oil and heat from about 350° F. to 560° F. in about 30 minutes. Add 50 pounds of boiled linseed oil to chill the mix, removing the source of heat. After the temperature has fallen to about 400° F., thin with 475 pounds of mineral spirits. It may be desirable to add 5–10% of dipentene to the thinner to reduce skinning and wrinkling tendencies.

EXAMPLE 3

Mix 125 pounds of my resin with 300 pounds of China-wood oil and heat from 350° to 560° F. in about 25 minutes. Remove the source of heat and chill the mixture with 175 pounds of bodied linseed oil. After cooling thin with mineral spirits to 25–30 solids.

My new resin when used in the varnishes of Example 2 and 3, as well as in varnishes generally, produces highly suitable results and is very acceptable to the trade.

Varnishes made therefrom have excellent color stability.

Furthermore, the softening point of the resin is of importance in the varnish industry. Softening points between approximately 80° and 125° C. are usually desired with softening points between 90° and 120° C. preferred.

The softening points of my new resin fall within these limits, even though substantially all of the unsaturates present in the starting material are polymerized.

Moreover, the softening point of my new resin may be varied, for instance, by varying the amount of catalyst employed in its preparation, as demonstrated by the data in Table 2.

Although in Example 1 both liquids, namely catalyst and unsaturated compound, are diluted prior to their admixture, it is to be understood that variations are possible. For instance, all of the diluent may be first mixed with the catalyst and the other liquid may be added in concentrated form, particularly if the principles set forth herein are observed. Or the larger part of the diluent may be added to either one of the liquids (either catalyst or starting material) so that the other is relatively concentrated. It is also possible with the exercise of extreme care and adherence to the principles set forth herein, to use both liquids in more concentrated form. Other variations are possible. When adding one liquid to another with agitation, I find it convenient and often preferable to do this below the surface of one of the liquids.

Any other suitable alkali such as sodium hydroxide, sodium carbonate, sodium bicarbonate, magnesium hydroxide, an amine or other basic substance might be substituted for quicklime in Example 1 followed by a non-acidic drying agent such as sodium sulphate or soda lime. Both neutralizing and drying is effected by quicklime. Or the catalyst might be removed in any other manner.

When using boron trifluoride gas as a catalyst, I prefer to employ a water jacketted closed kettle and to introduce the gas into the kettle either above the solution in a manner so that the gas will be present in low concentration, or to introduce the gas directly into the solution but in diluted form.

For instance, if the space above the solution is previously filled with air or with an inert gas such as nitrogen, it is good practice to introduce boron trifluoride gas into this space in a manner to hold its concentration below said 2%.

When the boron trifluoride gas is diluted with another gas, such as nitrogen, and is introduced directly into the solution, it is also good practice to hold the concentration of boron trifluoride gas in the gas mixture below say 2%.

Since the boron trifluoride gas is absorbed by the solution the feeding of gas, either into the space above the solution or into the solution itself, is stopped after the desired quantity of catalyst has been absorbed.

Other variations are possible and will occur to persons skilled in the art upon becoming familiar with this invention.

While I have particularly described my invention it is to be understood that this is by way of illustration and that changes, omissions, additions, substitutions and/or modifications might be made within the scope of the claims without departing from the spirit of the invention which is intended to be limited only as required by the prior art.

I claim:

1. A process comprising catalytically polymerizing a hydrocarbon fraction obtained from light oil produced during the pyrolytic decomposition of petroleum oil for the manufacture of combustible gas and free from substantial amounts of oxygen-containing compounds, said fraction having 5% and 90% boiling points between approximately 167.2° C. and 174.6° C. and containing a plurality of unsaturated hydrocarbons, by contacting said fraction with a readily hydrolyzable metallic halide catalyst to catalyze the formation of polymer.

2. A process comprising catalytically polymerizing a hydrocarbon fraction obtained from light oil produced during the pyrolytic decomposition of petroleum oil for the manufacture of combustible gas and free from substantial amounts of oxygen-containing compounds, said fraction having 10% and 80% boiling points between approximately 167.4° C. and 173.2° C. and containing a plurality of unsaturated hydrocarbons, by contacting said fraction with a readily hydrolyzable boron trifluoride-organic solvent complex to catalyze the formation of polymer, said catalyst complex resulting from the admixture of boron trifluoride with an organic solvent capable of reacting therewith to form said complex.

3. A process comprising catalytically polymerizing a hydrocarbon fraction obtained from light oil produced during the pyrolytic decomposition of petroleum oil for the manufacture of combustible gas and free from substantial amounts of oxygen-containing compounds, said fraction having 10% and 80% boiling points between approximately 167.4° C. and 173.2° C. and containing a plurality of unsaturated hydrocarbons, by contacting said fraction with a readily hydrolyzable aluminum chloride-organic solvent complex to catalyze the formation of polymer, said catalyst complex resulting from the admixture of aluminum chloride with an organic solvent capable of reacting therewith to form said complex.

4. Resin resulting from the process of claim 1.
5. Resin resulting from the process of claim 2.
6. Resin resulting from the process of claim 3.
7. A process according to claim 1 in which the hydrocarbon fraction polymerized is a freshly distilled fraction.

ALGER L. WARD.